United States Patent Office 3,433,836
Patented Mar. 18, 1969

3,433,836
α-DIARYL α,ω-ALKYLENE GLYCOL-DILOWER-ALKYLAMINES
Francis J. Petracek, Canoga Park, Calif., assignor to Rexall Drug and Chemical Company, Los Angeles, Calif., a corporation of Delaware
No Drawing. Filed Jan. 14, 1966, Ser. No. 520,651
U.S. Cl. 260—570       3 Claims
Int. Cl. C07c 91/08, 91/04

ABSTRACT OF THE DISCLOSURE

Substituted glycols of the formula:

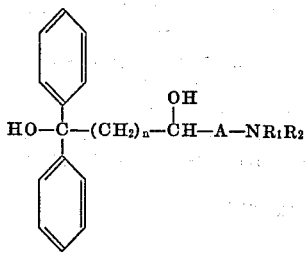

wherein n is 1 to 4, A is lower alkylene and —NR₁R₂ is di-lower alkylamino. The compounds exhibit anti-inflammatory and antipyretic activity, and are useful as chemical intermediates in the preparation of other pharmacologically active compounds.

---

This invention relates to compositions of matter classified in the art of chemistry as substituted α,ω-alkylene glycols.

The invention sought to be patented is described as residing in the concept of a chemical compound having a molecular structure wherein there is attached to the α,ω-alkylene glycol nucleus having an alkylene chain of 1 to 4 carbon atoms separating the α and ω carbon atoms, at the α carbon atom, two phenyl radicals, and at the ω carbon atom, a di-lower alkylamino-lower alkylene radical.

As used throughout this application the terms "lower alkyl," "lower alkylene," and "lower alkoxy" embrace both straight and branched chain alkyl, alkylene, and alkoxy radicals, respectively, containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl and the like in the case of "lower alkyl," methylene (—CH₂—)

ethylene (—CH₂CH₂—), n-propylene (—CH₂CH₂CH₂—)

isopropylene (—CH₂CH(CH₃)CH₂—), n-butylene (—CH₂CH₂CH₂CH₂—)

tert-butylene (—CH₂C(CH₃)₂—), n-amylene (—CH₂CH₂CH₂CH₂CH₂—)

n-hexylene (—CH₂CH₂CH₂CH₂CH₂CH₂—), 2-ethylbutylene (—CH₂—CH(CH₂CH₃)CH₂CH₂—), 2,3-dimethylbutylene (—CH₂CH(CH₃)—CH(CH₃)CH₂—) and the like in the case of "lower alkylene" and methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy and the like in the case of "lower alkoxy"; and the term "halo" embraces chloro, fluoro, iodo and bromo.

The tangible embodiments of this invention possess the inherent general physical characteristics of being solid crystalline materials. Nuclear Magnetic Resonance (NMR) data, infra-red and ultraviolet spectral data and elemental analysis, taken together with the aforementioned physical properties, the nature of the starting materials and the mode of synthesis, positively confirm the structure of the compounds sought to be patented.

The tangible embodiments of this invention possess the inherent applied use characteristics of having signficant pharmacological activity, without adverse toxicity, as antipyretic and anti-inflammatory agents as determined by recognized and accepted pharmacological test procedures. In addition the tangible embodiments of this invention possess the inherent applied use characteristics of being valuable as chemical intermediates. For example, treatment of the tangible embodiments of this invention where the α and ω carbon atoms of the nucleus are separated by a 2 carbon atom alkylene chain with a strong mineral acid causes ring closure and formation of 2-di-lower alkylamino-lower alkyl-5,5-diphenyltetrahydrofurans which are described and claimed in my application entitled "Diphenyltetrahydrofuran-lower alkylamines and Intermediates Obtained in the Synthesis Thereof," filed concurrently herewith.

The manner and process of making and using the invention will now be generally described so as to enable a person skilled in the art of chemistry to make and use the same as follows:

The reaction sequence leading to the substituted α,ω-alkylene glycols of this invention is set forth as follows:

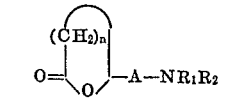

STARTING MATERIALS

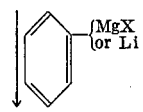

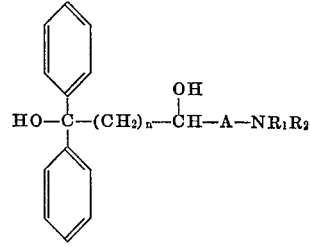

FINAL PRODUCT wherein n is 1 to 4, A is lower alkylene, —NR₁R₂ is a di-lower alkylamino radical and X is halo.

The starting materials in the above-depicted reaction sequence are hydroxyamino acid lactones that are readily prepared from their corresponding hydroxyamino acids by heating in the presence of a strong acid. For example, 5-dimethylamino-4-hydroxyvaleric acid, 6-dimethylamino-4-hydroxyhexanoic acid, 6 - dimethylamino - 5 - hydroxyhexanoic acid, 5-dimethylamino - 4 - hydroxy-3-methylvaleric acid, 5-diethylamino-2,3-dimethyl-4-hydroxyvaleric acid are converted to their corresponding lactones by heating in the presence of at least one mole of a strong mineral acid such as hydrochloric acid.

In the preparation of the tangible embodiments of this invention the lactone starting material is treated with a reagent capable of opening the lactone ring and linking thereto two phenyl groups or their hereinafter described equivalents, for example phenyllithium, or a phenyl Grignard reagent such as a phenylmagnesium halide. The conversion to the final product takes place in the presence of an inert solvent such as, for example, ether, petroleum ether, and at a temperature of up to the reflux temperature of the solvent used. The product is recovered by conventional techniques of isolation and purification.

Starting materials in which the di-lower alkylamino radical (—NR$_1$R$_2$) is replaced by an amino or mono-lower alkylamino radical or by a heterocyclic ring linked to the lower alkylene bridge attached to the ω-carbon atom of the nucleus through a nitrogen atom, such as piperidino, pyrrolidino, morpholino, piperazino and the like and/or phenyl linking reagents having one or more lower alkyl, lower alkoxy, halo or trifluoromethyl radicals on the benzene ring are the full equivalents of the specific starting materials and reagents, respectively, depicted in the above-described reaction sequence. Their use results in the production of similarly substituted final products, such final products having the same utility as the specific α,ω-alkylene glycols depicted hereinabove.

In addition, the 1–4 carbon atom alkylene chain linking the α and ω carbon atoms of the α,ω-alkylene glycol nucleus can be substituted with one or more lower alkyl radicals. Such final products are prepared as above described and have the same utility as the specific final products depicted hereinabove.

The tangible embodiments of this invention can, if desired, be converted into nontoxic pharmaceutically acceptable acid addition and quaternary ammonium salts. Salts which can be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially with hydroxy organic acids and polybasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid addition and quaternary ammonium salts are the full equivalents of the bases from which they are derived and are included within the scope of this invention.

The tangible embodiments of this invention, either as free bases or in the form of a nontoxic pharmaceutically acceptable acid addition or quaternary ammonium salt, can be combined with conventional pharmaceutical diluents and carriers to form such dosage forms as tablets, suspensions, solutions, suppositories and the like.

The best mode contemplated by the inventor for carrying out the invention will now be set forth as follows:

Example 1.—5-dimethylamino-1,1-diphenylpentane-1,4-diol

To 4-hydroxy-5-dimethylaminovaleric acid lactone (5 g., 0.035 mole) dissolved in ether (100 ml.), and protected from the atmosphere, is added with stirring a 4 molar ratio of phenyllithium (65 ml. of a benzene/petroleum ether solution). After addition the mixture is refluxed for about 30 minutes. Water (100 ml.) is added and a solid material separates out that is combined with additional solids extracted out of the remaining ether layer to yield a total of 7.5 g. (71%). The product is recrystallized from acetonitrile, M.P. 148°–150° C.

*Analysis.*—Calculated for C$_{19}$H$_{25}$NO$_2$: C, 76.22%; H, 8.42%; N, 4.68%; O, 10.69%. Found: C, 75.8%; H, 8.24%; N, 5.00%; O, 10.81%.

Example 2.—1,1-di-(p-chlorophenyl)-5-dimethylaminopentane-1,4-diol

To a 1.4 molar solution (122 ml.) in benzene of p-chlorophenyl Grignard reagent is added with stirring 4-hydroxy-5-dimethylaminovaleric acid lactone (10 g., 2.2 moles). A solid separates from the solution that is worked up to yield 10 g. (45%) of product that is recrystallized from acetonitrile, M.P. 119°–121° C.

*Analysis.*—Calculated for C$_{19}$H$_{23}$NO$_2$Cl$_2$: C, 61.95%; H, 6.29%; N, 3.80%; O, 8.68%; Cl, 19.2%. Found: C, 62.09%; H, 6.42%; N, 3.63%; O, 9.16%; Cl, 18.9%.

The subject matter which the applicant regards as his invention is particularly pointed out and distinctly claimed as follows:

1. A compound of the formula

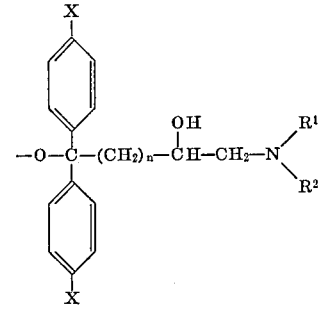

wherein $n$ is 1 to 4, —NR$^1$R$^2$ is di-lower alkylamino and X is hydrogen or chlorine.

2. A compound according to claim 1 wherein $n$ is 2, —NR$^1$R$^2$ is di-lower alkylamino and X is hydrogen.

3. A compound according to claim 1 wherein $n$ is 2, —NR$^1$R$^2$ is di-lower alkylamino and X is chlorine.

References Cited

UNITED STATES PATENTS 2,954,383    9/1960    Schlesinger et al. __ 260—326.3

OTHER REFERENCES

Buehler et al., "Journal Organic Chemistry," vol. 26, pp. 1573–77 (1961).

CHARLES B. PARKER, *Primary Examiner.*

ROBERT V. HINES, *Assistant Examiner.*

U.S. Cl. X.R.

260—284.7, 247.7, 268, 326.5, 343, 343.5, 343.6, 343.9, 347.7, 534, 501.14, 501.18; 424—330

UNITED STATES PATENT OFFICE
CERTIFICATE OF CORRECTION

Patent No. 3,433,836　　　　　　　　　　　　　　　　　　　　March 18, 1969

Francis J. Petracek

It is certified that error appears in the above identified patent and that said Letters Patent are hereby corrected as shown below:

Column 4, lines 26 to 39, the formula should appear as shown below:

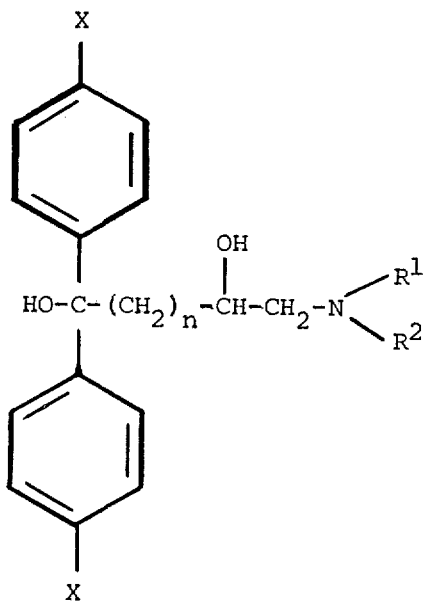

Column 4, line 8, "75.8%" should read -- 75.88% --.

Signed and sealed this 7th day of April 1970.

(SEAL)
Attest:

EDWARD M. FLETCHER, JR.　　　　　　　　　　　WILLIAM E. SCHUYLER, JR.
Attesting Officer　　　　　　　　　　　　　　Commissioner of Patents